United States Patent [19]
Dickey

[11] Patent Number: 4,747,034
[45] Date of Patent: May 24, 1988

[54] HIGH EFFICIENCY BATTERY ADAPTER

[75] Inventor: David V. Dickey, 1675 El Caserio Ct., San Luis Obispo, Calif. 93401

[73] Assignees: David V. Dickey; Carol S. Dickey, both of San Luis Obispo, Calif.

[21] Appl. No.: 22,106

[22] Filed: Mar. 5, 1987

[51] Int. Cl.[4] .......................................... H02M 3/335
[52] U.S. Cl. ........................................... 363/23; 363/19
[58] Field of Search ............................. 363/19, 22, 23; 340/636

[56] References Cited

U.S. PATENT DOCUMENTS

| | | | |
|---|---|---|---|
| 3,487,335 | 12/1969 | Lingle | 363/22 X |
| 4,287,517 | 9/1981 | Nagel | 340/636 |
| 4,338,596 | 7/1982 | Huber et al. | 340/636 |
| 4,542,450 | 9/1985 | Patel | 363/23 |
| 4,598,243 | 7/1986 | Kawakami | 340/636 X |
| 4,609,850 | 9/1986 | Hamlet | 363/23 X |
| 4,626,765 | 12/1986 | Tamaka | 340/636 X |

Primary Examiner—R. Skudy
Assistant Examiner—Marc S. Hoff
Attorney, Agent, or Firm—Daniel C. McKown

[57] ABSTRACT

Extremely high efficiency is achieved in a DC to DC converter by using a relaxation oscillator in which two transistors alternately conduct current to the primary winding of a step-up transformer. The transistors are interconnected by a resistor and capacitor in series so that when the converter is lightly loaded, the saturable reactor in the circuit will be self-resonant, so as to draw only minimal power from the battery source. The converter also includes a battery charge level monitor circuit that prevents the DC to DC converter from oscillating and thus providing power unless the battery is above a minimum charge level when its voltage is applied to the converter. In a preferred embodiment, the converter provides an output of up to 100 watts.

1 Claim, 1 Drawing Sheet

HIGH EFFICIENCY BATTERY ADAPTER

BACKGROUND OF THE INVENTION

1. Field of the Invention

The present invention is in the field of electrical power supplies, and more specifically relates to a solid-state, extremely high efficiency inverter that permits a device that operates on a first DC voltage to be powered by a DC source providing a second voltage.

2. The Prior Art

The present invention is an electronic device that is connected between, for example, a computer that requires 144 volts DC, and a battery that produces 12 volts DC. Since it adapts the battery voltage to a different level, the present invention is commonly called a battery adapter.

Known devices for accomplishing this task have suffered from one or more defects of the type now to be discussed.

In one type of battery adapter, a relatively large amount of preloading is required, and the power dissipated in the preloading resistor is typically 10% of the total output capacity of the device. This dissipation is independent of the load, and can result in depletion of the battery even though the adapter is not powering any other device.

Another type of problem has been noticed where the device to be powered is a computer or other scientific device that is sensitive to variations in its power supply. If the battery is not fully charged initially, or discharges through use to a lower terminal voltage, the battery adapter may not be capable of coping with such a range of input voltages. In such cases, the output of the battery adapter may deviate from the desired voltage, or may cease altogether. Either outcome can have serious consequences for the apparatus being powered. For example, a computer may operate erratically when its supply voltage decreases, and the computer may lose valuable data when the supply power ceases without warning.

In another type of situation, the device being powered may require an amount of power that varies considerably with respect to time. For example, some computers require a large initial power surge as the various disk drives and monitors are all turned on initially. Some prior art adapters could not provide the required initial current surge.

As will be seen below, the battery adapter of the present invention avoids the aforementioned problems of prior art battery adapters.

SUMMARY OF THE INVENTION

It is an objective of the present invention to provide a battery adapter that is highly efficient.

It is a further object of the present invention to provide a battery adapter that can deliver a wide range of output currents so that it can be used with loads that fluctuate widely.

It is a further object of the present invention to provide a battery adapter which dissipates only minimal amounts of power when it is not supplying current to another device.

It is a further object of the present invention to provide a battery adapter which will not supply current to its load unless the input voltage to the battery adapter is adequate. This assures that operation of the device to be powered will not be undertaken unless the supply power is adequately charged.

It is a further object of the present invention to provide a battery adapter that includes a charge level indicator that continually visually displays the state of charge of the supply battery so that the user of the powered device will be able to tell at a glance the condition of the battery.

These objectives of the present invention are fulfilled by the circuitry to be described below in greater detail.

In accordance with the preferred embodiment of the present invention, the battery adapter includes an oscillator that has a self-resonant mode that minimizes dissipation of power when the adapter is lightly loaded. In addition, the self-resonant oscillator circuit greatly reduces the amount of preloading of the output, thereby resulting in a much higher efficiency.

In accordance with the preferred embodiment, the battery adapter includes a charge level monitoring circuit that produces a visual output, the brightness of which indicates the degree to which the battery is charged.

In accordance with the preferred embodiment, the battery adapter also includes a warning buzzer that indicates when the battery voltage is approaching an unusably low level and gives the user time to shut down and turn off the device being powered.

In accordance with a preferred embodiment, the battery adapter includes circuitry that prevents the oscillator from operating if the battery voltage is below a preset level.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
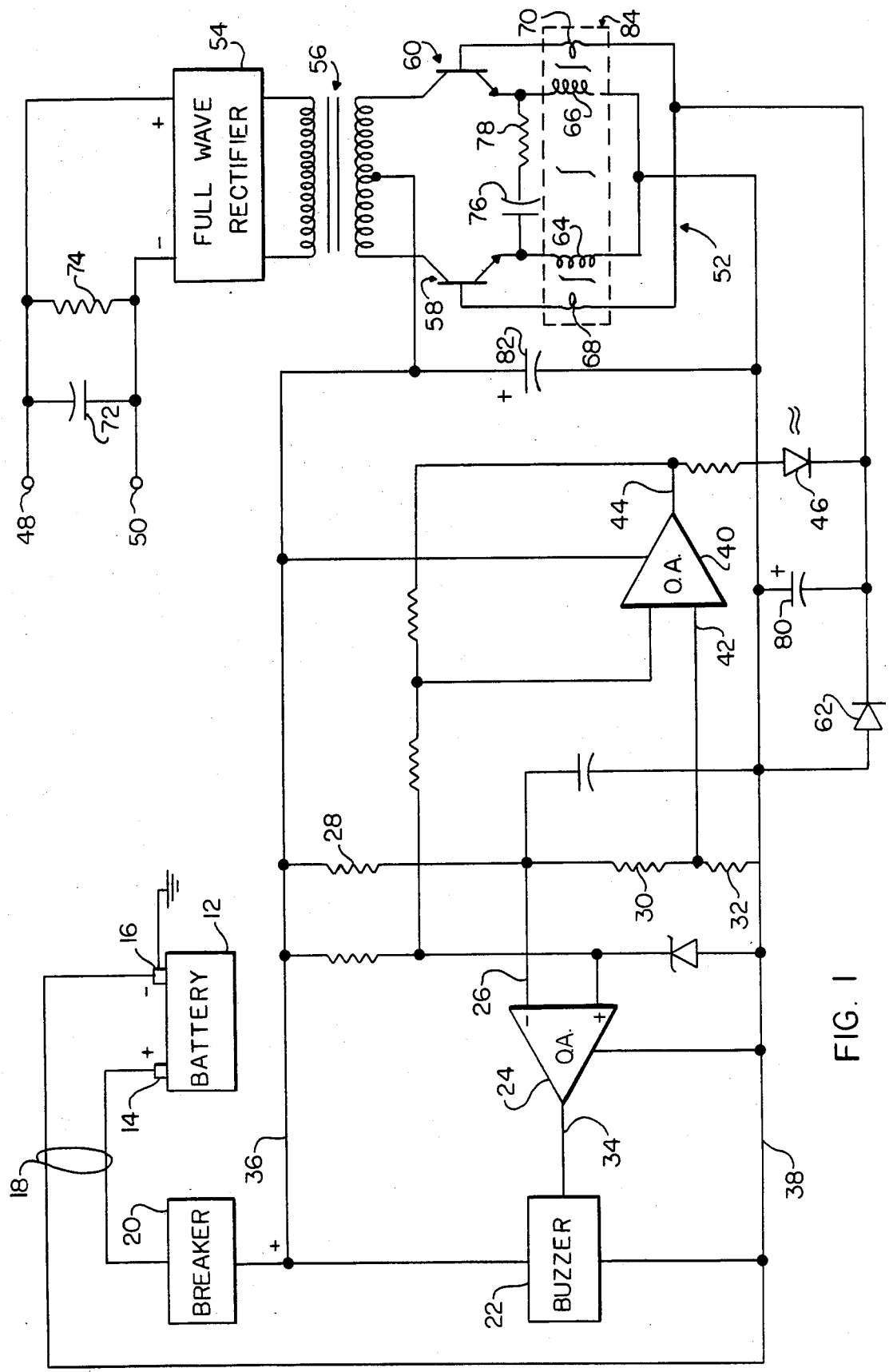
FIG. 1 is a schematic circuit diagram showing a preferred embodiment of the battery adapter of the present invention.

The battery adapter is powered by the battery 12, which has a positive terminal 14 and a negative terminal 16. Typically, the battery 12 is of the lead-acid type or the nickel-cadmium type, although still other types may be used. The circuit can be designed for various battery voltages, but in the preferred embodiment, the nominal battery voltage is 12 volts, and the battery voltage is assumed to range from zero to a maximum of 16 volts. The power from the battery 12 enters the battery adapter through the input power cord 18. In the preferred embodiment, the input power cord can handle an input current of 8 amperes. The negative terminal 16 of the battery 12 is grounded, and regarded as the zero voltage level from which other voltages in the circuit are measured.

The positive terminal 14 of the battery is connected to the circuit breaker 20, which trips at 8 amperes in the preferred embodiment.

A buzzer 22 is connected between the positive line 36 and the ground line 38. The buzzer 22 is controlled by the operational amplifier 24, which provides an enabling output on the line 34. The bias voltage on the reference terminal 26 of the operational amplifier 24 is determined by the relative values of the resistances 28, 30, and 32. In the preferred embodiment, the operational amplifier 24 is biased in such a way that the buzzer 22 will operate only when the battery voltage falls below 11 volts.

Likewise, the reference terminal 42 of the operational amplifier 40 is biased by the resistors 28, 30, and 32 in such a way that the output on the line 44 remains at ground for battery voltages less than approximately 10 volts in the preferred embodiment, so that the indicator lamp 46 will emit no light when the battery voltage is less than approximately 10 volts.

For progressively increasing battery voltages from 10 volts to 12 volts, the output of the operational amplifier 40 on the line 44 increases from zero to approximately 6.0 volts. At the latter voltage, there is sufficient current in the line 44 to cause the indicator lamp 46 to emit visible light and to start the oscillator portion 52 of the battery adapter running.

When the battery is at full charge, approximately 14 volts, the output on the line 44 is at full battery voltage, the indicator lamp 46 is at full intensity, and the oscillator 52 is being given full base drive current to start it oscillating at a low power level. The oscillator 52 operates entirely from the current flowing through the line 44 until load is applied across the output terminals 48, 50.

In the preferred embodiment, the battery adapter is designed to have a maximum output power of 80 watts. When a load that requires more than a few watts is connected across the output terminals 48, 50, that load is reflected back through the full wave rectifier 54 and the step-up transformer 56. The required increased base current for the transistors 58, 60 is then drawn through the power rectifier 62.

Once the transistors 58, 60 are running in a square wave oscillating mode at about 12 to 15 Khz, the base drive for the transistors is all provided by the feedback windings 68, 70 of the saturable reactor windings 64, 66. Approximately 13% of the emitter current is fed back to the base of the active transistor until the saturable reactor saturates, at which time the base current is cut off, the transistor that was on is turned off, and the collapse of the field within the transformer turns on the opposite transistor. In this manner, the oscillation continues with the two transistors alternately conducting the full current to the transformer 56. The transformer 56 is wound with adequate inductance, so that the transformer appears to be a fully linear transformer not driven into saturation.

The voltage drop across the transistors 58, 60 is less than 0.3 volt, out of a total of approximately 12 volts applied from the battery, i.e., a loss of only 2% of the total operating power. Some additional power is lost in the transformer 56, and that is also on the order of 2%.

A small capacitor 72 is provided for filtering the output of the full wave rectifier 54. The resistor 74 serves to discharge the capacitor 72 so that there is no possibility of a shock hazard if the output terminals are touched after the device has been turned off.

Under no-load conditions when the emitter current feed through the transistors 58, 60 is very low because of the high inductance of the transformer 56, the saturable reactor 84 operates in a self-resonant mode using the capacitor 76 and the resistor 78 in series with the reactor 84 to cause the oscillations to continue and maintaining the correct output voltage, but running at a very minimum amount of transistor power loss. This design feature, of incorporating the capacitor 76 and the resistor 78, eliminates the need to preload the output to any greater extent than is already provided by the simple resistor 74. This is in contrast to the situation in conventional DC to DC converters in which the preloading required is typically 10% of the total output capacity or where additional windings and devices are incorporated.

The capacitor 80 serves to prevent the voltage applied to the oscillator 52 from changing as the transistors alternately turn on and turn off, by imposing a distinct delay between the time when one transistor turns off and the other transistor turns on. This increases the efficiency by preventing excessive power loss, and it also reduces the potential for damage to the transistors 58, 60.

In the preferred embodiment, considerable attention has been given to reducing electromagnetic interference. The battery ground connection coming through the input cord 18 is carried through into the metal case of the device and is secured to a conductor on the circuit board. The ground lug for the output cord is also attached to the same conductor which also serves as the circuit board ground. This is done to minimize radiated or conducted noise coming back through the switching power supply and also to eliminate possible shock hazards that would occur if the earth grounding was not correctly returned to earth. Part of the filtering to prevent the electrical noise from the oscillator circuit from radiating back is the use of the polarized capacitor 82.

Thus, there has been described a DC to DC converter that has extremely high efficiency and that includes a battery charge level monitor circuit. The latter provides a visual indication of the condition of the battery and also assures that the converter will not start to operate unless the battery voltage exceeds a preset level. If, during operation, the battery voltage falls below a preset level, a buzzer will sound an audible warning that allows the user time to shut down the computer or other apparatus that is powered by the converter.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A DC to DC converter powered by a battery that has a positive terminal and a negative terminal and that provides current at an input voltage measured with respect to the negative terminal, said DC to DC converter comprising:
   an operational amplifier coupled to the battery and responsive to the input voltage and so biased that when the input voltage is less than a certain voltage $V_0$, the output voltage of said operational amplifier is at the potential of the negative terminal of the battery, and when the input voltage increased above $V_0$, the output voltage of said operational amplifier increases in relation to the input voltage, until when the input voltage reaches a certain voltage $V_1$ indicating the battery is fully charged, the output voltage of said operational amplifier equals $V_1$;

an oscillator circuit that includes two transistors that alternately conduct current, each of said two transistors having a base, a collector, and an emitter, said oscillator circuit further comprising:

one saturable reactor having two primary windings and two feedback windings;

a resistor;

a capacitor; and, an output transformer having a center-tapped primary winding, the center tap connected to the positive terminal of the battery, and each end of the primary winding connected to the collector of one of said two transistors;

each emitter connected to the negative terminal of the battery through a primary winding of said saturable reactor;

each base connected to the output of said operational amplifier through a feedback winding of said saturable reactor so that the two transistors do not conduct and start oscillation unless the output voltage of said operational amplifier is greater than a certain voltage $V_2$;

the emitters connected by said resistor and said capacitor connected in series so that under lightly-loaded conditions when the current supplied by the transistors to the primary windings of said output transformer is minimal, said saturable reactor operates in a self-resonant mode to minimize power loss in said two transistors.

* * * * *